United States Patent
Reed et al.

(10) Patent No.: US 9,951,889 B2
(45) Date of Patent: Apr. 24, 2018

(54) CABLE TIE AND RETENTION SYSTEM

(71) Applicant: Tyco Electronics UK Ltd, Swindon (GB)

(72) Inventors: Martyn Reed, San Ramon, CA (US); Roy MacNaughton, Swindon (GB)

(73) Assignee: Tyco Electronics UK Ltd, Wiltshire (GB)

( * ) Notice: Subject to any disclaimer, the term of this patent is extended or adjusted under 35 U.S.C. 154(b) by 0 days.

(21) Appl. No.: 14/689,228

(22) Filed: Apr. 17, 2015

(65) Prior Publication Data

US 2015/0226354 A1 Aug. 13, 2015

Related U.S. Application Data

(63) Continuation of application No. PCT/GB2013/052727, filed on Oct. 18, 2013.

(30) Foreign Application Priority Data

Oct. 18, 2012 (GB) .................................. 1218727.4

(51) Int. Cl.
*F16L 3/10* (2006.01)
*F16L 3/233* (2006.01)
(Continued)

(52) U.S. Cl.
CPC .......... *F16L 3/2336* (2013.01); *F16B 13/061* (2013.01); *F16B 23/00* (2013.01);
(Continued)

(58) Field of Classification Search
None
See application file for complete search history.

(56) References Cited

U.S. PATENT DOCUMENTS 3,701,302 A 10/1972 Pestka
3,875,889 A * 4/1975 Robbins .................. B63H 9/10
114/102.19
(Continued)

FOREIGN PATENT DOCUMENTS

DE 102008041230.9 A1 2/2010
EP 0555187 A1 8/1993
(Continued)

OTHER PUBLICATIONS

Chinese Office Action and English translation, dated Aug. 26, 2016, 21 pages.
(Continued)

*Primary Examiner* — Joanne Silbermann
(74) *Attorney, Agent, or Firm* — Barley Snyder (57) ABSTRACT

A cable tie system has a cable tie member and a cable retaining member. The cable tie member has a base with an inner facing surface and an outer facing surface, a pair of cable tie strips connected to the base and projecting outward from the inner facing surface, and a locking member connected to the base and projecting outward from outer facing surface. The cable retaining member has a retainer housing with a top surface, a bottom surface, a pair of tie strip receiving passageways complimentary to the cable tie strips, a resilient tie strip engaging arm positioned in each tie strip receiving passageway and in releasable contact with one of the cable tie strips when the cable tie strips are positioned in the tie strip receiving passageways, and a release member connected to an end of each resilient tie strip engaging arm.

21 Claims, 12 Drawing Sheets

(51) Int. Cl.
*H02G 3/04* (2006.01)
*F16B 13/06* (2006.01)
*F16B 23/00* (2006.01)
*H02G 7/08* (2006.01)
*H02G 3/32* (2006.01)

(52) U.S. Cl.
CPC ........... *F16L 3/1058* (2013.01); *F16L 3/1091* (2013.01); *H02G 3/0437* (2013.01); *H02G 3/32* (2013.01); *H02G 7/08* (2013.01)

(56) References Cited

U.S. PATENT DOCUMENTS

| | | | |
|---|---|---|---|
| 4,993,669 A | 2/1991 | Dyer | |
| 6,126,122 A * | 10/2000 | Ismert | F16L 3/221 |
| | | | 24/271 |
| 6,464,181 B2 | 10/2002 | Sakakura | |
| 7,527,226 B2 | 5/2009 | Kusuda et al. | |
| 8,141,826 B1 * | 3/2012 | Gallardo | F16L 3/1091 |
| | | | 24/16 R |
| 2001/0010349 A1 | 8/2001 | Sakakura | |
| 2003/0080259 A1 | 5/2003 | Robicheau | |
| 2007/0138350 A1 * | 6/2007 | Brown | F16L 3/1025 |
| | | | 248/65 |
| 2007/0231099 A1 | 10/2007 | Bryant | |
| 2009/0189026 A1 | 7/2009 | Bourgeois | |

FOREIGN PATENT DOCUMENTS

| | | |
|---|---|---|
| FR | 2173452 A5 | 10/1973 |
| WO | 9100973 A1 | 1/1991 |
| WO | 2008028607 A2 | 3/2009 |

OTHER PUBLICATIONS

International Search Report, International Application No. PCT/GB2013/052727, dated Mar. 25, 2014, 6 pages.
PCT Notification of Transmittal of International Preliminary Report on Patentability, International Preliminary Report on Patentability, Intl Appl. No. PCT/GB2013/052727, dated Apr. 30, 2015, 11 pages.
Third Party Observation for application No. WO2013GB52727, dated Jul. 13, 2015, 3 pages.
English translation of Chinese Office Action, dated May 2, 2017, 9 pages.
Chinese Office Action, dated May 2, 2017, 7 pages.
Notice of Reasons for Refusal and English translation, dated Sep. 26, 2017, 10 pages.

* cited by examiner

CABLE TIE AND RETENTION SYSTEM

CROSS-REFERENCE TO RELATED APPLICATIONS

This application is a continuation of PCT International Application No. PCT/GB2013/052727, dated Oct. 18, 2013, which claims priority under 35 U.S.C. § 119 to British Patent Application No. 1218727.4 dated Oct. 18, 2012.

FIELD OF THE INVENTION

The invention is generally related to an electrical cable tie system, and, more specifically, to an electrical cable tie and retention system for retaining cable bundles in raceways.

BACKGROUND

In many fields of engineering, notably aircraft manufacture, bundles of cables such as electric wires or fibre optic cables run in raceways. The raceways are generally open channels made of extruded aluminium. The bundles are retained in the channels at intervals by retainers locked into the channels. Often a raceway section has several parallel channels formed during a single extrusion, and it is important to ensure that the wires or cables are securely retained in their respective channels. If the wires and cables are not securely retain in their respective channels, they easily can become entangled with one another and become dislodged from their respective channels.

One conventional type of cable tie, known as a harpoon tie, is an elongated retainer, usually made of a plastics material, having at one end a small flat base beyond which a harpoon-like retention hook projects. The retention hoop has a resilient arrowhead which can be pushed through a corresponding aperture disposed at the bottom of the channel, the arrowhead having resilient barbs that engage the underside of the channel to hold the retainer in place with the flat base on the channel floor. The cable tie is positioned centrally within the channel, projecting upwards from the channel floor, and a wire harness is laid in the channel, the wires being separated 50:50 on each side of the tie and a retainer secured to the tie, typically by a latching arrangement.

The conventional harpoon cable tie is often time-consuming to install, as the ties need to be positioned about every 150 mm along the channel. It would be preferable to have a system that enabled wiring to be simply dropped in the channel as it is removed from its packaging, without the need to split it on either side of each tie, thereby saving time and reducing the risk of damage.

There is also a need for an improved method of removing the cable retainers from the harpoon ties and removing the harpoon ties themselves from their attachment to the raceway channel floor. The latter currently involves pressing inwardly the barbs on each harpoon tie to allow it, along with the fair lead and cable retainer, to be pulled out of the raceway in one operation. A specialty tool is conventionally required for this purpose, having a recess to engage the harpoon tie on the underside of the raceway, and, spaced from the recess, a fulcrum to engage part of the structure in which the raceway is mounted. The tool is rocked on the fulcrum to place the recess into engagement with the harpoon tie and compress the barbs inwardly as the tie is pulled out of the raceway from above. This involves great care to avoid damaging the wires retained by the tie.

Another conventional cable tie is shown in U.S. Pat. No. 4,993,669 ('669). In '669, the cable or bundle tie arrangement has a plastic tie strap and a tie head. The tie head includes a housing having a pair of spaced apart slots forming a pair of strap-receiving passageways. Each passageway has an entrance opening and at least one of them has an exit opening. A pawl-receiving channel extends through the housing along the passageway, the channel having at least one channel opening disposed substantially normal to the entrance openings where an intermediate portion of the channel intersects each of the passageways. A pawl member is mounted in the channel through the channel opening and includes a base portion and pair of arms extending from opposite sides of the base. Each of the arms has a free end with a blade section to engage an inner surface of a strap passing through one of the passageways. The strap can thus be pulled tight around a wire bundle and lockingly maintain the tension around the article or bundle being tied.

SUMMARY

A cable tie system has a cable tie member and a cable retaining member. The cable tie member has a base with an inner facing surface and an outer facing surface, a pair of cable tie strips connected to the base and projecting outward from the inner facing surface, and a locking member connected to the base and projecting outward from outer facing surface. The cable retaining member has a retainer housing with a top surface, a bottom surface, a pair of tie strip receiving passageways complimentary to the cable tie strips, a resilient tie strip engaging arm positioned in each tie strip receiving passageway and in releasable contact with one of the cable tie strips when the cable tie strips are positioned in the tie strip receiving passageways, and a release member connected to an end of each resilient tie strip engaging arm.

BRIEF DESCRIPTION OF THE DRAWINGS

The invention will now be described by way of example, with reference to the accompanying Figures, of which.

DETAILED DESCRIPTION OF THE EMBODIMENT(S)

In the embodiments of FIGS. 1(a)-2(b), a cable tie system has a cable tie member 10 and a cable retaining member 20. Both the cable tie member 10 and the cable retaining member 20 are made of a resilient plastics material, such nylon. In an embodiment the members 10,20 are integrally moulded.

Figure 1A:
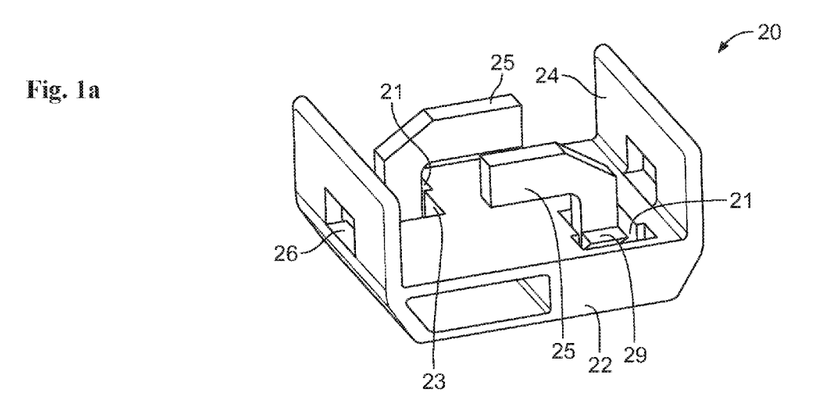
FIG. 1(a) is a perspective view of a cable retaining member of a cable tie system.
Figure 1B:
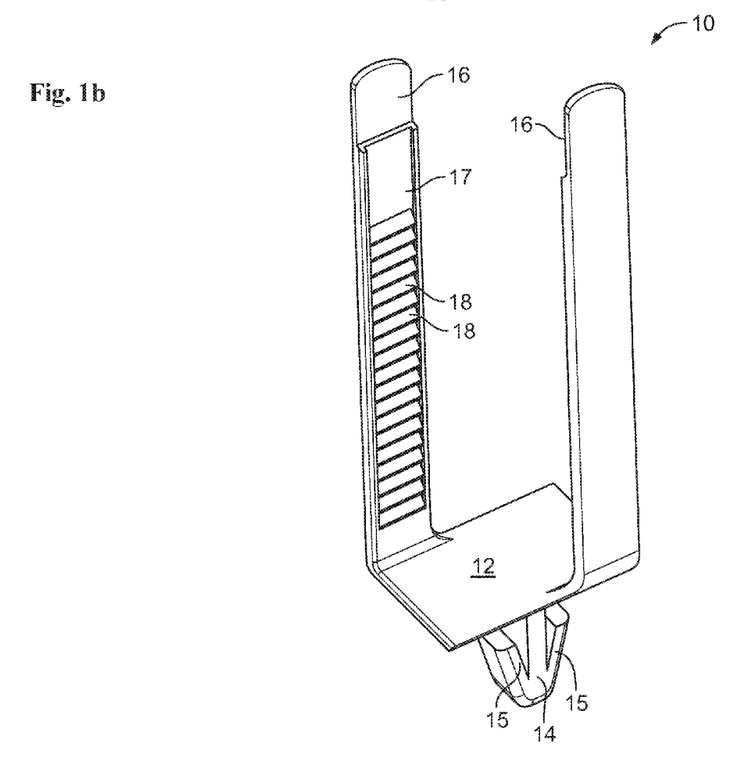
FIG. 1(b) is a perspective view of a cable tie member of the cable tie system.
Figure 2A:
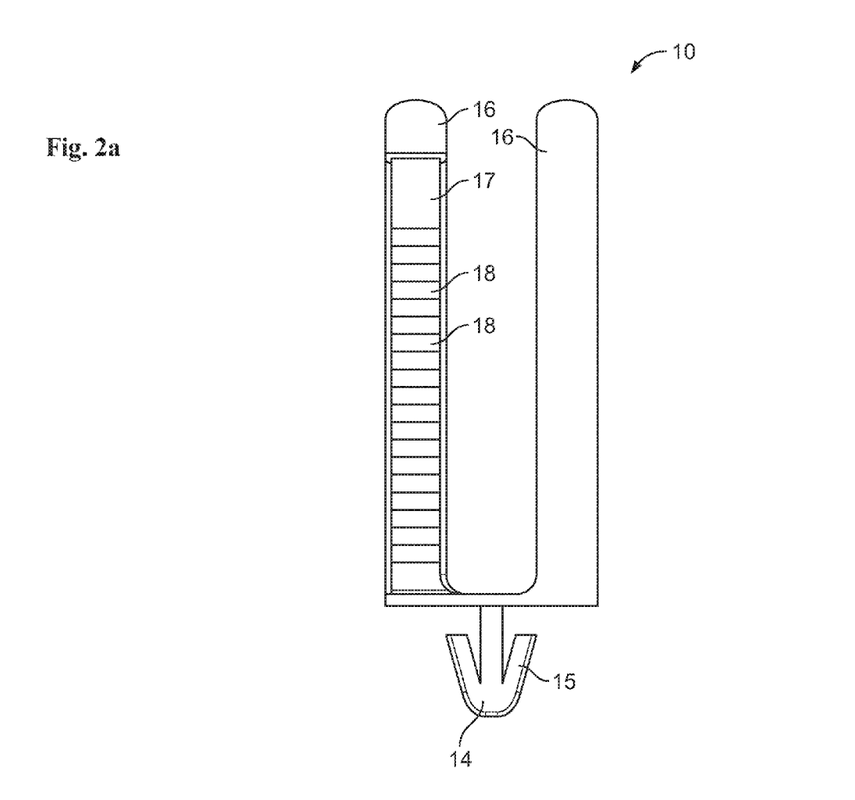
FIG. 2(a) is a front elevation view of the cable tie member.

The cable tie member 10 has an approximately rectangular flat base 12, shaped and dimensioned to rest on a floor of a cable raceway. A barbed locking member 14 is positioned on an outer facing surface of the base 12. The locking member 14 projects outwardly from a central position on the outer facing surface of the base 12. The locking member 14 has an approximately rectangular locking projection having a central member with a fixed end connected to the base, and an opposite free end having pair of resilient barbs 15 on opposite surfaces. To secure the tie cable member 10 in position, the locking member 14 is pushed through a corresponding locking member receiving hole disposed in the floor of a raceway, the barbs 15 being compressed towards the central member as the locking member 14 is pushed through the aperture, and then resiliently expanding outwards again to lock the cable tie member 10 onto the raceway floor.

The cable tie member 10 also includes two flexible cable tie strips 16 connected on opposite edges of the base 12, projecting outward from an inner facing surface opposite the outer facing surface. The two flexible cable tie strips 16 are offset relative to one another on opposite ends of the opposite edges of the base 12. The cable tie strips 16 are shaped and positioned to lie against opposite walls of a cable raceway, each having an inwardly facing surface 17 having a ratcheting strip 18 disposed thereon. The ratcheting strip 18 has a plurality of ratcheting teeth 18.

Figure 2B:
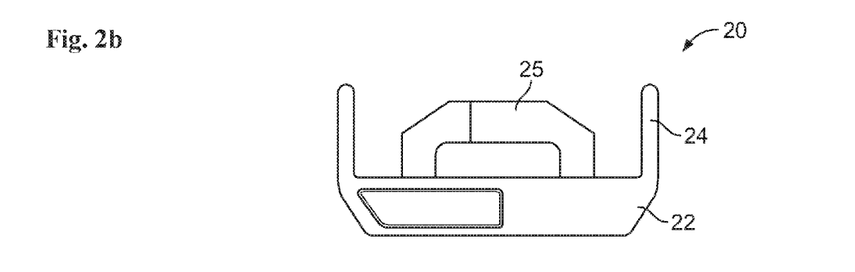
FIG. 2(b) is a front elevation view of the cable retaining member.

The cable retaining member 20 has a retainer housing 22 with vertically extending tie strip receiving passageways 21 in the form of slots extending from a top surface to a bottom surface, to receive respective cable tie strips 16. To retain the cable tie strips 16, integrally formed resilient tie strip engaging arms 25 are provided, each being cantilevered and having engaging teeth 29 extending into tie strip receiving passageways 21 to engage the ratcheting strip 18 of one of the cable tie strips 16. The tie strip engaging arms 25 extend outward from the top surface of the retainer floor, being formed integrally with the retainer floor and moveable resiliently in a rocking motion as can best be seen in FIG. 4.

Figure 3:
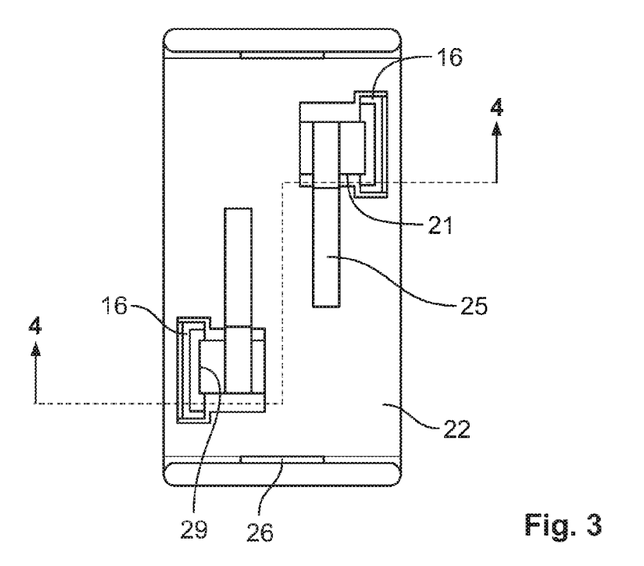
FIG. 3 is a top plan view of the cable retaining member engaged with cable tie strips of the cable tie member.
Figure 4:
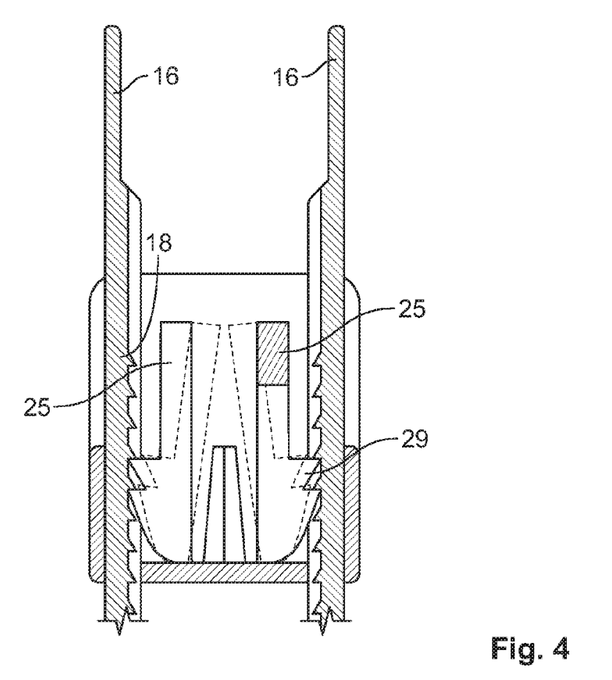
FIG. 4 is a cross-sectional view of the cable retaining member along the line 4-4 in FIG. 3.

In the embodiments of FIGS. 3 and 4, the cable tie strips 16 extend through the tie strip receiving passageways 21, the respective ratcheting strip surfaces 17 engaging the engaging teeth 29 of the tie strip engaging arms 25. In FIG. 4, the teeth 29 of the tie strip engaging arms 25 engage the ratchet teeth 18 of the cable tie strips 16. The two tie strip engaging arms 25 may be pinched together to disengage the engaging teeth 29 from the cable tie strips 16 to allow the cable retaining member 20 to be disengaged from the cable tie member 10.

Figure 5:
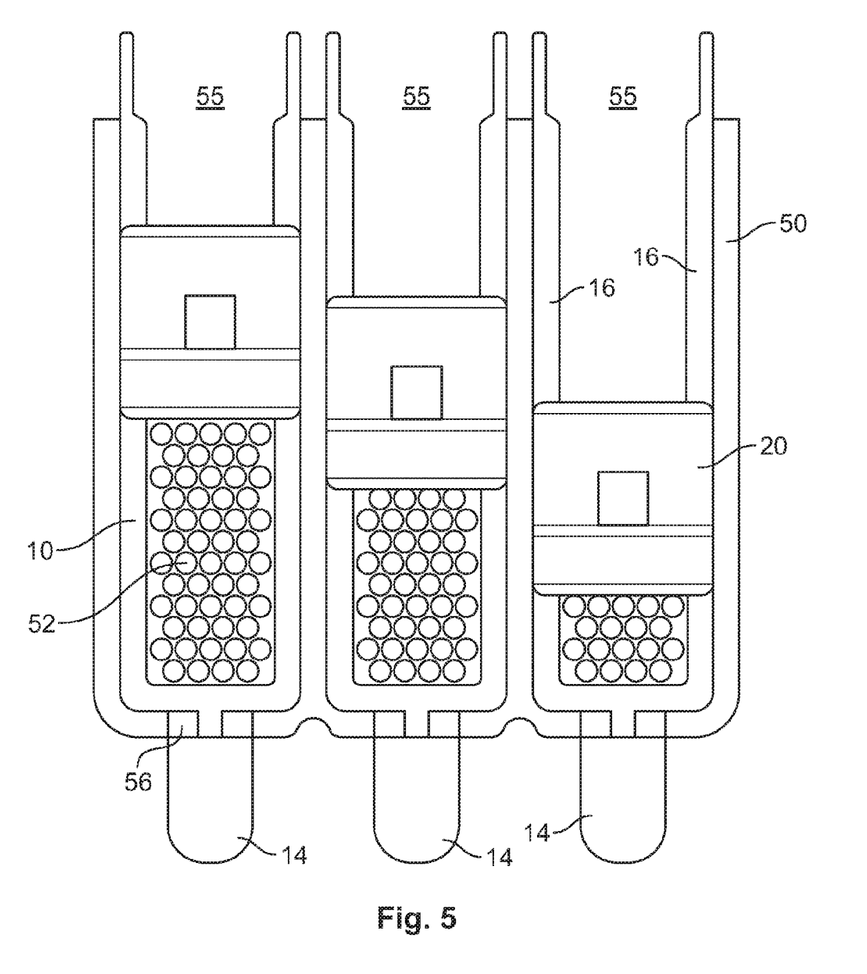
FIG. 5 is a cross-sectional view of a cable receiving raceway having three channels, each channel having the cable tie system.

In an embodiment shown in FIG. 5, a raceway 50 has three channels 55, each channel 55 having a wire bundle 52 enclosed between a cable tie strip 16 of the cable tie system of FIGS. 1 to 4. The wire bundles 52 are held in place by the cable tie member 10 being engaged to cable retaining member 20. The ratcheting strip surfaces 17 on the cable tie strips 16 enable the cable retainer members 20 to be pushed down to an appropriate height for the size of the wire bundle 52, so as to retain the bundle 52 against substantial movement. Also shown in the embodiment of FIG. 5, barbed locking members 14 pass through apertures 56 in the raceway 50 floor, where the barbs 15 engage the underside of the raceway 50 to hold the cable tie members 10 in place.

Figure 6:
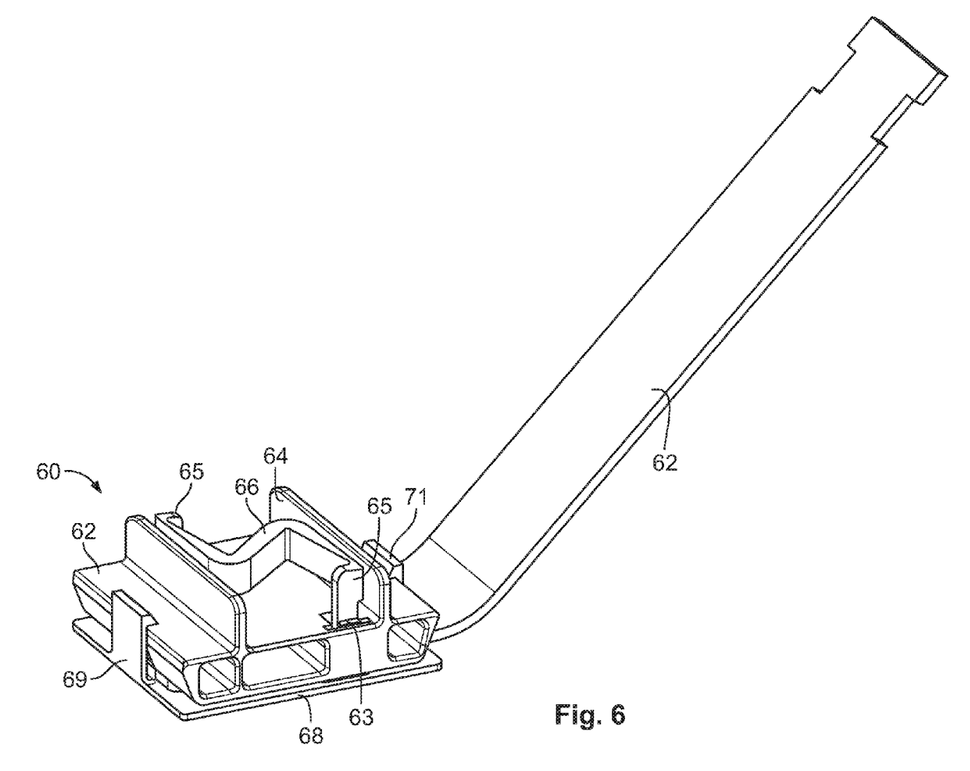
FIG. 6 is a perspective view of a cable breakout assembly using a cable tie system.
Figure 7A:
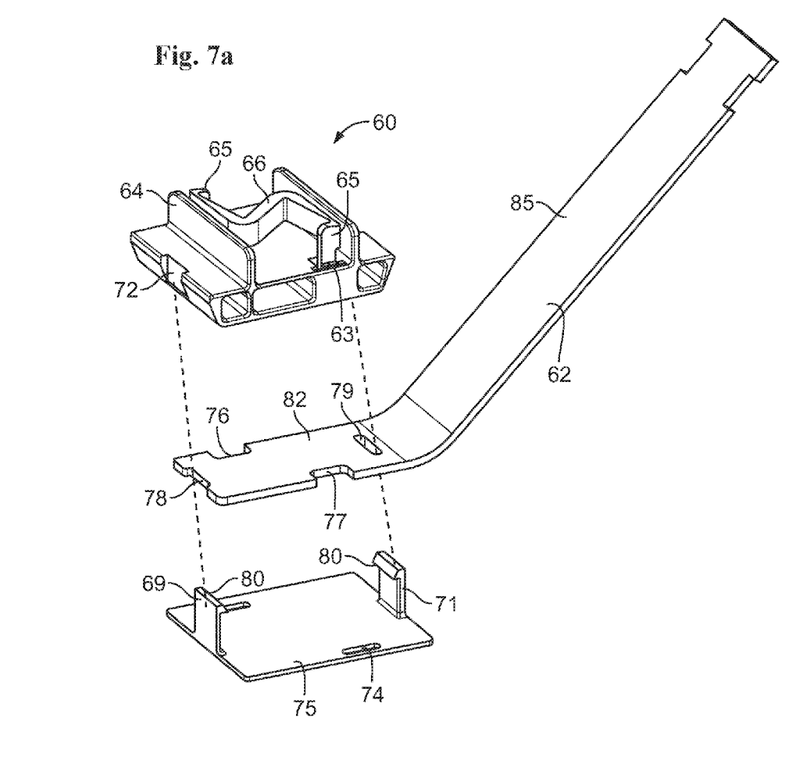
FIG. 7(a) is an exploded view of the cable breakout assembly of FIG. 6.
Figure 7B:
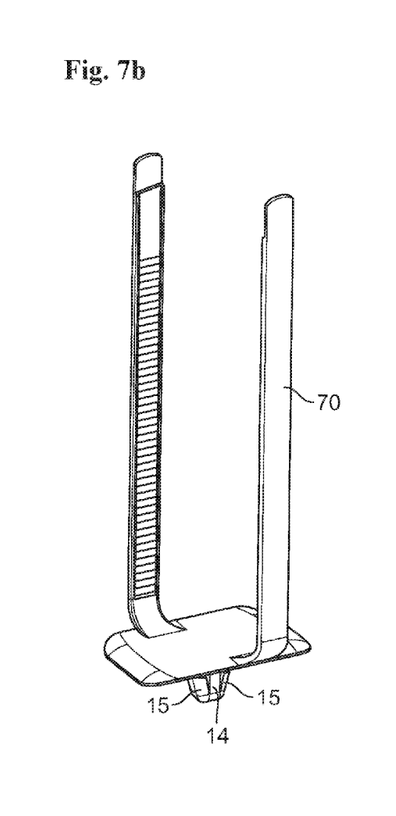
FIG. 7(b) is a perspective view of a cable tie member.

In the embodiments shown in FIGS. 6-7(b), a cable breakout support 62 to support a wire bundle 52 leaving a channel 55 of a cable raceway 50. The assembly has a cable tie member 70 substantially similar to that of the embodiments of FIGS. 1(b) to 5 and a cable retaining member 60, which engages the cable tie strips 16 of the cable tie member in substantially the same way as in the previously discussed embodiments. The cable retaining member 60 has a retainer body 62 through which extends a pair of tie strip receiving passageways 63. The cable tie strips 16 of the cable tie member 70 are complementary in shape to the tie strip receiving passageways 63, and can be inserted therethrough. Within the cable retainer housing 22, the cable tie strips 16 are engageable with resilient tie strip engaging arms 65 which, within the retainer housing 22, are shaped and mounted in substantially the same way as the tie strip engaging arms 25 of the above discussed embodiments. These tie strip engaging arms 65 are however, connected to one another by an integrally formed resilient connecting member 66 having an approximate Z-shape. When the connecting member 66 is twisted in a counter-clockwise direction, as shown in FIGS. 6 and 7a, both tie strip engaging arms 65 are displaced towards the centre of the retainer housing 22 and away from the ratcheting strip surfaces 17 of cable tie strips 16 extending through the tie strip receiving passageways 63. Thus, the cable retaining member 60 is disengaged from the cable tie strips 16 to facilitate the removal of the cable tie member 70. As the cable retaining member 70 is likely to be quite small, the connecting member 66 can be gripped with pliers for this purpose.

In an embodiment, the cable retaining member 60 has a width similar to that of the raceway channel 55 in which it is mounted. Therefore, the cable retaining member 60 will be prevented from rotating when the connecting member 66 is gripped and twisted. Those of ordinary skill in the art would appreciate that the above descriptions of the cable retaining member 60 generally apply to the cable retaining member 20.

In an embodiment shown in FIG. 6, the cable breakout support 62 is secured under the cable retaining member 60 by a breakout retention plate 68 that is snap fitted to the cable retaining member 60. When the cable breakout support 62 is used, the retention plate 68 contacts the wire bundle 52 in the raceway channel 50, applying a retaining force on the wire bundle 52.

In an embodiment shown in FIG. 7, a breakout retention plate 75, substantially similar to the breakout retention plate 68, has a planar, approximately rectangular shape with a pair of second tie strip receiving passageways 74 that align with the tie strip receiving passageways 63 of the cable retaining member 60 and the cable tie strips 16 of the cable tie member 70. Integrally formed at opposite ends of the breakout retention plate 75 are retainer member engaging arms 69, 71 having fixed ends connected to the breakout retention plate 75 and opposite free ends. The retainer member engaging arms 69,71 each have a hook formation 80 disposed on the free end, and the retainer member engaging arms 69,71 are positioned in corresponding recesses 72 on the cable retaining member 60.

The cable breakout support 62 has an elongated planar base 82 and a guide strip 85 connected on one end of the planar base 82, extending outwardly from the base 82 at an obtuse angle. The base 82 has tie strip receiving notches 76, 77 that each align with one of the second tie strip receiving passageways 74 of the breakout retention plate 75 and one of the tie strip receiving passageway 63 of the cable retaining member 60. The cable tie strips 16 are thus able to pass through the second tie strip receiving passageways 74, the tie strip receiving notches 76,77, and the tie strip receiving passageways 63. The base 82 also has on a terminating end, one engaging arm receiving notch 78 to receive the retainer member engaging arm 69, and on an opposite end adjacent the guide strip 85, an engaging arm receiving passageway 79 for passage of retainer member engaging arm 71.

Figure 8:
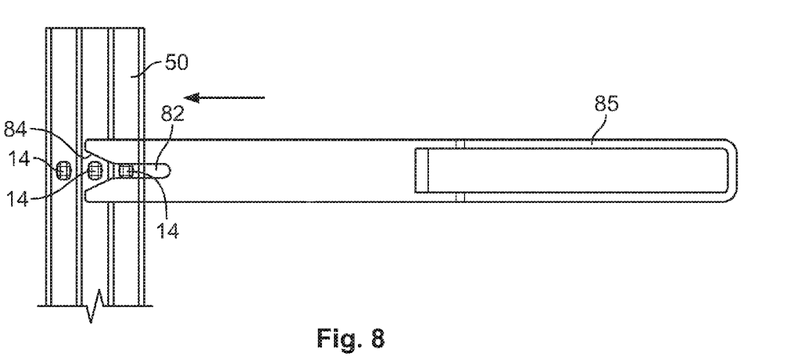
FIG. 8 is a top plan view of a cable retainer releasing tool.
Figure 9:
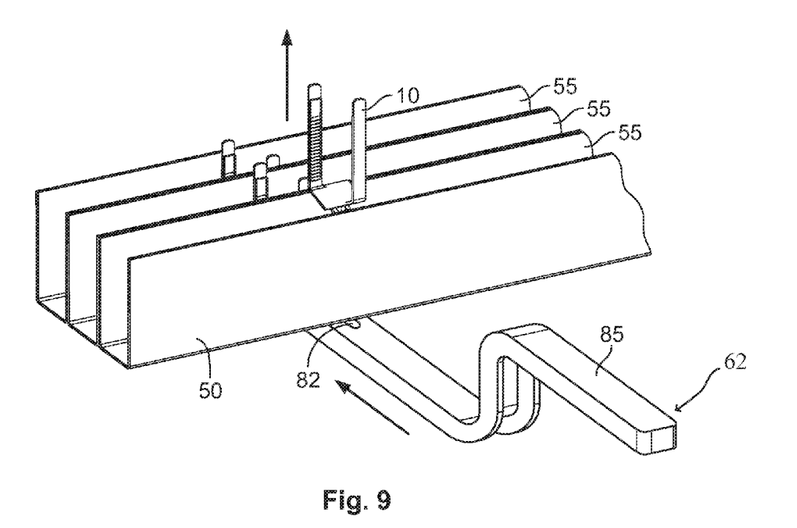
FIG. 9 is a perspective view of the cable retainer releasing tool engaged with the cable retaining member.

In the embodiments shown in FIGS. 8 and 9, a cable retainer releasing tool 80 engages the cable retaining member 70 positioned in one channel 55 of the raceway 50. The cable retainer releasing tool 80 has a handle 85 at one end, and at an opposite end, an open-ended locking member receiving slot 82 having a pair of outwardly tapering surfaces 84 at the open end to engage the locking members 14 of cable retaining members 70. The cable retainer releasing tool 80 has an upper surface that is placed against a bottom surface of the raceway 50, aligned with the locking members 14, and pushed at a right angle to the locking members 14 so that the locking members 14 are successively engaged in the locking member receiving slot 82. As each locking member 14 passes through the tapered end of the locking member receiving slot 82 to the locking member receiving slot's 82 narrowest portion, the barbs 15 are pushed inwardly towards the central member until the barbs 15 are positioned close enough together to pass through the aperture 56 on the floor of the raceway 50. The cable tie member 10 can then be pulled out of the raceway channel 55, as shown in FIG. 9.

Figure 10:
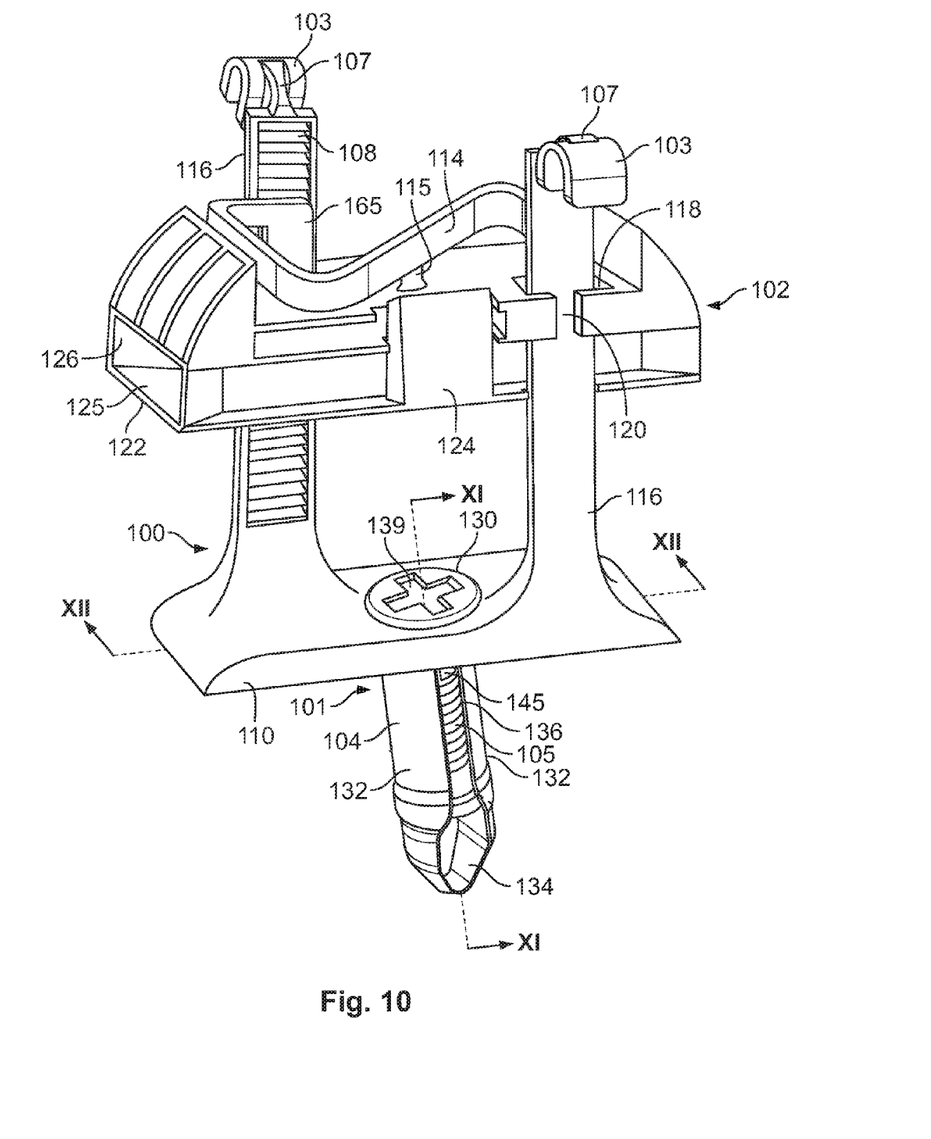
FIG. 10 is a perspective view of a cable tie member engaged with a cable retaining member and fairlead.

In an embodiment shown in FIG. 10, a cable tie member 100 is substantially similar in principle to the cable tie member 10 shown in FIG. 1b, but differs in two respects. First, the free ends of the cable tie strips 116 have hooks 103 positioned on an outwardly facing surface. The hooks 103 are integrally connected to the cable tie strips 116 through connecting portions 107, to engage opposed upper edges of a cable raceway 55. Secondly, the cable tie member 100 has a modified securing system 101 that includes a lock pin 105 positioned into a split sleeve 104.

The cable retaining member 102, which will be described in more detail below in relation to the embodiments shown in FIGS. 14 to 16, differs from that of the cable retaining member 60 in the embodiments FIGS. 6 and 7a in at least two regards. First, the cable tie receiving passageways 118 have centrally positioned openings 120 to enable the hooks 103 of the cable tie strips 116 to be longitudinally inserted through the cable tie receiving passageways 118. The cable tie trips 116 are inserted by sliding the respective connecting portions 107 through the openings 120. Secondly, a connecting member 114 of the cable retaining member 102 that connects the tie strip engaging arms 165 is connected to the retainer housing 22 at a central location by a resilient connecting post 115. The connecting post 115 prevents vibration of the connecting member 114 in use, which could result in disengagement of the tie strip engaging arms 165 from the cable tie members 100, or even in breakage of the connecting member 114 itself.

Figure 11:
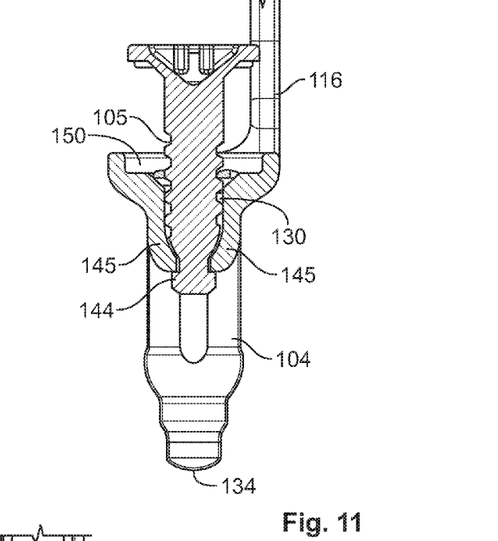
FIG. 11 is a partial cross-sectional view on the line XI-XI in FIG. 10.
Figure 12:
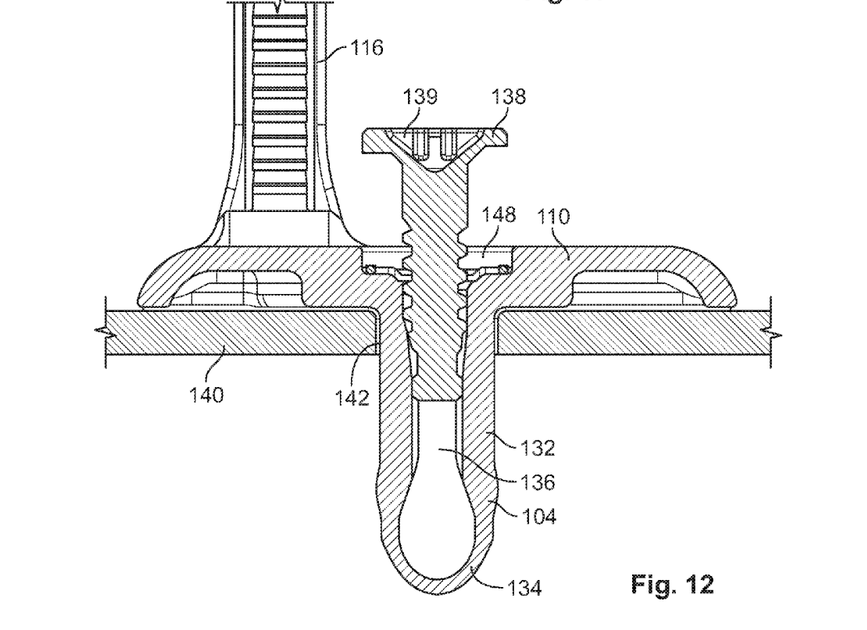
FIG. 12 is a partial cross-sectional view of the line XII-XII in FIG. 10.
Figure 13:
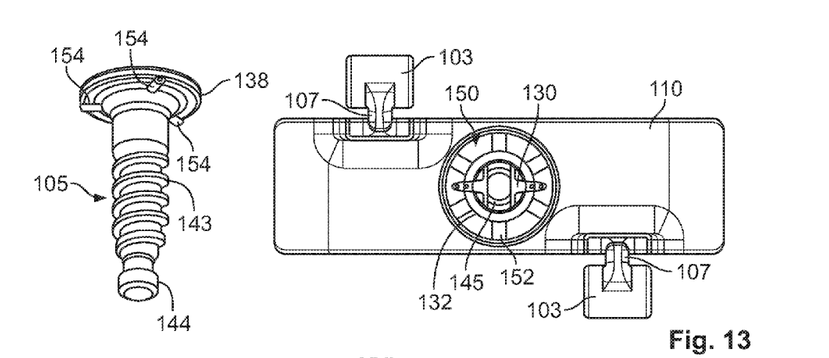
FIG. 13 is a top plan view of the cable tie member of FIG. 10, with a perspective view of a removed locking pin.

In the embodiments of the securing system 101 shown in FIGS. 11-13, a base 110 of the cable tie member 100 has a centrally positioned pin receiving hole 130 extending therethrough for insertion of a lock pin 105, shown fully inserted in FIG. 10, partially inserted in FIGS. 11 and 12, and separately in FIG. 13. Extending downwardly from the base 110 is a split sleeve 104, shown in partial cross section in FIGS. 11 and 12. The split sleeve 104 may be formed integrally with the cable tie member base 110, or may be formed as an insert for simplicity of construction.

The split sleeve 104 includes two downwardly extending sleeve extending sections 132, each having a semi-circular cross-section, and being coaxial with the lock pin 105. The two sleeve extending sections 132 each have a fixed end that is in contact with the base 110 of the cable tie member 100, and opposite free ends connected together by sleeve connecting portion 134. The sleeve extending sections 132 are divided from one and another by elongated slots 136 positioned on either side of a plane bisecting the cable tie member base 110 transversely.

The sleeve extending sections 132 are made of resilient material so as to be pushed radially apart from one another upon insertion of the lock pin 105.

The split sleeve 104 is shaped and dimensioned to be inserted with a close fit through a corresponding pin receiving hole 142 disposed in a raceway floor 140 (see FIG. 12), so that insertion of the lock pin pushes the sleeve extending sections 132 radially apart to retain the sleeve in the pin receiving hole 142. The pin receiving hole 142 is substantially similar to the locking member receiving hole discussed in the embodiments above.

In the embodiments shown in FIGS. 11 to 13, the lock pin 105 has a widened pinhead 138, a threaded shaft 143 and an enlarged leading end 144. The pinhead 138 is provided with a cross-shaped, rotating tool receiving recess 139 to receive an end of a correspondingly shaped screw driver for removal of the lock pin 105, as will be described below.

In an embodiment shown in FIG. 11, a resilient pawl 145 is positioned on the fixed end of each of the elongated slots 136, extending downwardly from the base 110 and slightly inwardly so as to engage the lock pin 105 when it is inserted between the elongated slots 136. The two pawls 145 are integrally connected with the base 110, as can be seen in FIG. 11. In the embodiments shown in FIGS. 11-13, just below the top surface of the cable tie member base 110, the pin receiving hole 130 has a widened section 148 forming an annular shoulder 150 with six radially extending protrusions 152 spaced circumferentially around the shoulder 150.

To secure the cable tie member 100 in position, the cable tie member 100 is placed on the floor 140 of a raceway 50, with the split sleeve 101 extending through the pin receiving hole 142. In the cable tie member, as supplied, the lock pin 105 is partially inserted into the split sleeve and retained by a breakable web. Although the shaft 143 of the lock pin 105 in threaded, the lock pin 105 does not have to be screwed into place. In an embodiment, a firm downward force can be used to push the lock pin 105 into the position shown in FIG. 10, pushing apart the pawls 145 which, when the lock pin 105 reaches a fully inserted position, engage the threaded shaft 143 to hold the lock pin 105 in position. In the fully inserted position, radial ridges 154 on an underside surface of the pinhead 138 engage in the respective radial recesses 152. Rotation of the lock pin 105 around its axis is thus prevented by the interaction of ridges 154 on the lock pin 105 and radial recesses 152 on the base 110.

The cable tie member 100 is thus held firmly in place on the floor 140 of a raceway 50, and the hooks 103 on the cable tie strips 116 can engage the upper edges of the raceway 55. Cables can then be laid along the upper surface of the cable tie member base 110, between the opposed cable tie strips 116, and the cable retaining member 102 pushed down on top of the bundles 52 of wires or cables to retain them in place.

To remove the cable tie member 100 from the raceway 50, a cross-headed screw driver or similar cable retainer releasing tool 80 is inserted into the recess 139 of the lock pin 105 and rotated counter-clockwise to withdraw the lock pin 105 from the split sleeve 104 in the manner of an ordinary screw. When the enlarged leading end 144 of the lock pin 105 reaches and abuts the lower ends of pawls 145, further axial withdrawal of the lock pin 105 is resisted. However, in this position, the sleeve extending sections 132 of the split sleeve 104 are close enough radially to enable the split sleeve 104 to be withdrawn through pin receiving hole 142.

The cable retaining member 102 also differs from previously described cable retaining members 20,60 in that the embodiment of the cable retaining member 102 includes an integrally formed fairlead 122 connected to by a hinge 164 (see FIG. 16) along one edge thereof and retained in position by an integral hook 124 positioned on the side of the fairlead opposite the hinge 164. The fairlead 122 has a wire receiving passageway 125 extending through the whole of its length to allow the insertion of wires after installation of the cable tie system. Inwardly tapering sides 126 assist in guiding wires through the wire receiving passageway 125.

Figure 14:
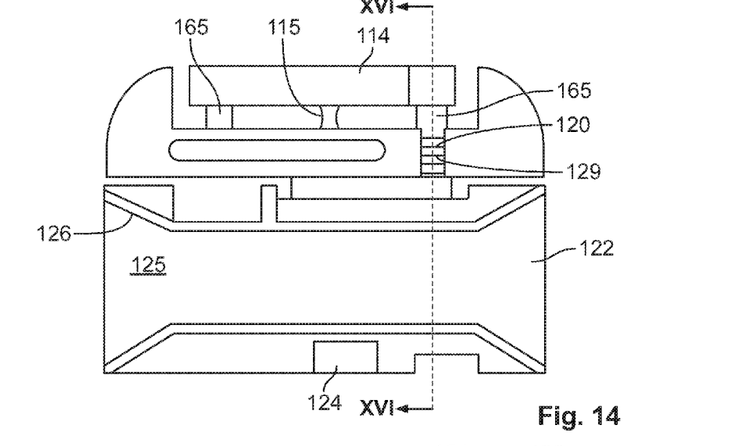
FIG. 14 is a front elevation view of the cable retaining member of FIG. 10, having the fairlead in an open position.
Figure 15:
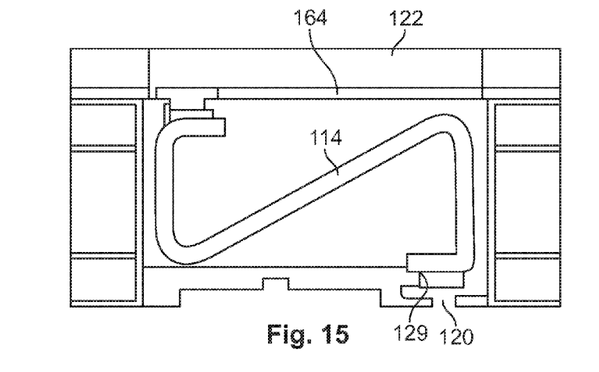
FIG. 15 is a top plan view of the cable retaining member in FIG. 14.
Figure 16:
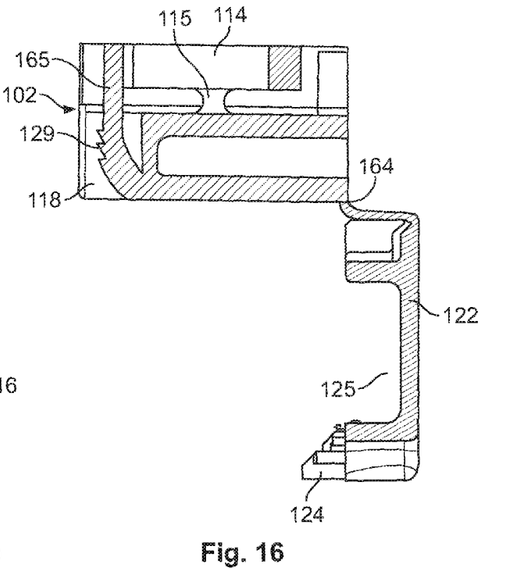
FIG. 16 is a partial cross-section on the line XVI-XVI of FIG. 14.

In the embodiments shown in FIGS. 14 to 16, the fairlead 122 is connected to the cable retaining member 102 by an integral hinge 164 which enables the fairlead 122 to assume the position at right angles to the cable retaining member 102. When assembling a cable tie member 100, before the cable retaining member 102 and fairlead 122 are threaded onto the cable tie strips 116, the fairlead 122 is rotated through 90° clockwise as shown in FIG. 16 so that the hook 124 engages an outer longitudinal edge of the cable retaining member 102 as shown in FIG. 10.

In an embodiment shown in FIG. 16, the cable retaining member 102 has tooth-shaped engaging members 129 disposed on the tie strip engaging arms 165 integrally connected to the retainer housing 22 at a first end, and integrally connected to the connecting member 114 at an opposite second end. The engaging members 129, positioned in the cable tie receiving passageways 118, are thus able to engage complimentary ratcheting teeth 108 of the cable tie strips 116. The engaging member 129 can be disengaged from the ratcheting teeth 108 by rotation of the connecting member 114 about the central connecting post 115. This cable retaining member 102 thus works in substantially the same way as the cable retaining member 60 embodiments shown in FIGS. 6 and 7.

Figure 17:
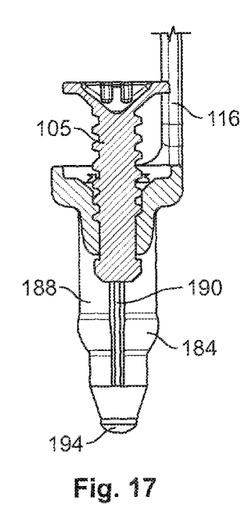
FIG. 17 is a cross-sectional view similar to that of FIG. 11, showing the cable tie member engaged with the cable retaining member and a fairlead having a split sleeve.
Figure 18:
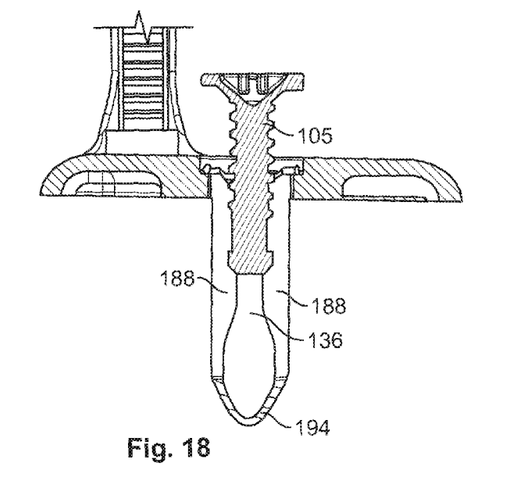
FIG. 18 is a cross sectional view similar to that of FIG. 12, showing the split sleeve of FIG. 11.

In the embodiment shown in FIGS. 17 and 18, a modified split sleeve 184, similar to the split sleeve 104 embodiment shown in of FIGS. 10 to 12, has an additional pair of narrow slits 190 aligned on a plane parallel to a longitudinally extending direction of the cable tie strips 116. These, together with the elongated slots 136, divide the modified split sleeve 184 into four quadrant sections 188, all of which are connected together at a free end 194 of the modified split sleeve 184.

Figure 19:
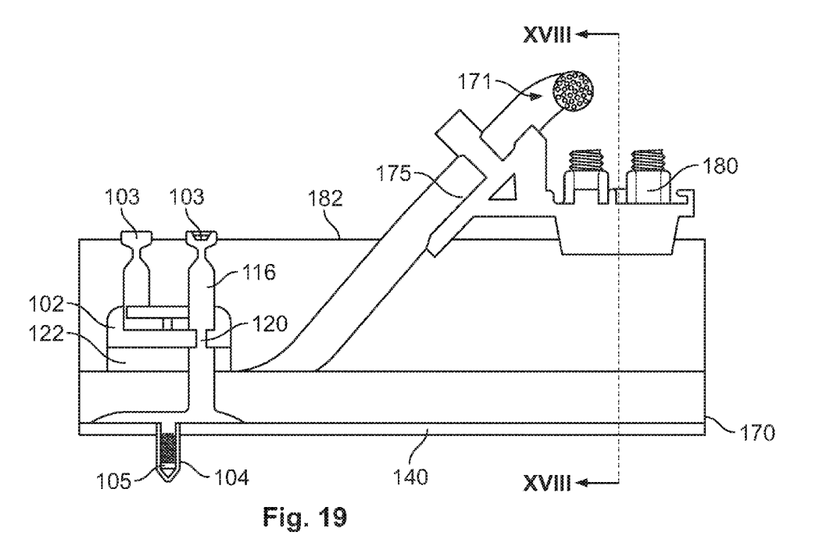
FIG. 19 is a schematic side elevation view of a cable tie and retainer system of the installed in a raceway, adjacent a cable breakout.
Figure 20:
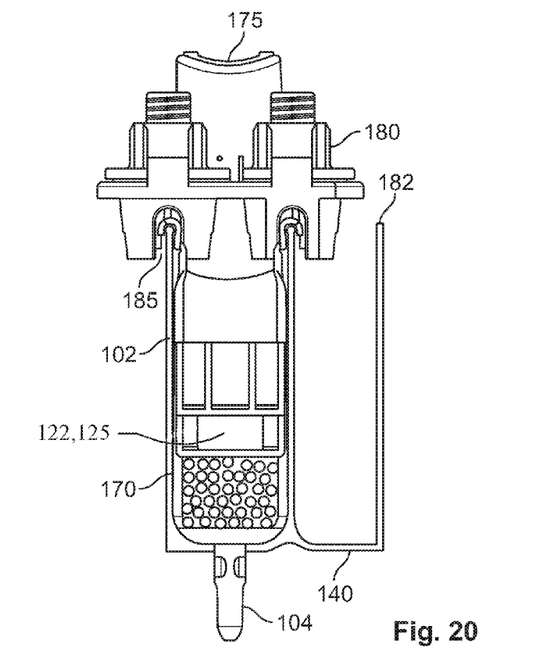
FIG. 20 is a partial cross-sectional view on the line XVIII-XVIII of FIG. 19.

In the embodiments shown in FIGS. 19 and 20, a cable or wire bundle 170 is positioned along a floor 140 of a raceway, passing between the cable tie strips 116 of a cable tie member 100. The split sleeve 104 of the cable tie member projects through an aperture disposed in the raceway floor, and a lock pin 105 is pushed therethrough to secure the cable tie member 100 in position. The hooks 103 engage over the upper edges 182 of the raceway, which may optionally be beaded, as shown in FIG. 20. The cable retaining member 102 and the fairlead 122 are shown schematically in FIG. 17. FIG. 20 clearly shows the wire receiving passageway through the fairlead 122 which can be used to thread additional wires after fitting of the cable retaining member 102.

A cable breakout member 175 is mounted on a support body 180 which straddles the opposed edges 182 of the raceway to receive a breakout cable 171.

Those of ordinary skill in the art would appreciate that the above embodiments are intended to be illustrated, and not restrictive. For example, many modifications may be made to the above embodiments by those of ordinary skill in the art, and various features described in different embodiments may be freely combined with each other without conflicting in configuration or principle.

Although several exemplary embodiments have been shown and described, it would be appreciated by those of ordinary skill in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" or "an embodiment" of the present invention are not intended to be interpreted as excluding the existence of additional embodiments that also incorporate the recited features. Moreover, unless explicitly stated to the contrary, embodiments "comprising," "including" or "having" an element or a plurality of elements having a particular property may include additional such elements not having that property.

What is claimed is:

1. A cable tie system comprising:
   a cable tie member having
     a base with an inner facing surface and an opposite outer facing surface,
     a pair of cable tie strips connected to the base and projecting outward from the inner facing surface,
     a locking member connected to the base and projecting outward from outer facing surface, and
   a cable retaining member having
     a retainer housing with
       a top surface,
       an opposite bottom surface, and
       a pair of tie strip receiving passageways complimentary to the cable tie strips, and extending from the top surface to the bottom surface, a resilient tie strip engaging arm positioned in each tie strip receiving passageway and in releasable contact with one of the cable tie strips when the cable tie strips are positioned in the tie strip receiving passageways, and a resilient connecting member connecting a free end of each resilient tie strip engaging arm to one another.

2. The cable tie system according to claim 1 wherein the locking member comprises:

a pin receiving hole disposed in the base;

a radially expandable split sleeve positioned on the outer facing surface of the base; and a lock pin.

3. The cable tie system according to claim 2, wherein when the lock pin is positioned through the pin receiving hole, the split sleeve is held in a radially expanded state and the lock pin is retained in the split sleeve; and when the lock pin has been removed from the split sleeve, the split sleeve is in a radially contracted state.

4. The cable tie system according to claim 3, wherein the split sleeve has two or more resilient sleeve extending sections, each having a fixed end connected to the outer surface of the base adjacent to the pin receiving hole, and opposite free ends connected together by a sleeve connection portion.

5. The cable tie system according to claim 2, wherein the locking pin is a screw or rivet.

6. The cable tie system according to claim 5 wherein the lock pin has a head with a rotating tool receiving recess disposed on an end opposite the leading end.

7. The cable tie system according to claim 2, wherein the lock pin is engaged with the base, having a leading end positioned in the pin receiving hole in a preliminary mating position, and an inserted position where the lock pin has been rotationally driven through the pin receiving hole from the preliminary mating position, and positioned in the radially expanded split sleeve.

8. The cable tie system according to claim 1, wherein the base is square or rectangular in shape.

9. The cable tie system according to claim 1, wherein the cable tie strips are connected to opposite edges of the base.

10. The cable tie system according to claim 9, wherein the cable tie strips are offset relative to one another on opposite ends of the base.

11. The cable tie system according to claim 1, wherein each cable tie strip has inwardly facing surface with a ratcheting strip, and the tie strip engaging arm has complimentary engaging teeth that releaseably engage the ratcheting strip.

12. The cable tie system according to claim 1 wherein each cable tie strip has a free end with a raceway engaging hook positioned on an outwardly facing surface.

13. The cable tie system according to claim 12, wherein the tie strip receiving passageways have centrally positioned openings that enable the raceway engaging hook to be longitudinally inserted through the cable tie receiving passageways.

14. The cable tie system according to claim 1, wherein the cable retaining member has tooth-shaped engaging members disposed on a portion of the tie strip engaging arms positioned in the tie strip receiving passageways, the engaging members being reversibly engaged with a corresponding portion of the cable tie strip positioned within the tie strip receiving passageway.

15. The cable tie system according to claim 1, wherein the resilient connecting member disengages both tie strip engaging arms from the cable tie strips when twisted.

16. The cable tie system according to claim 15 wherein the resilient connecting member is connected to the retainer housing at central position by a connecting post.

17. The cable tie system according to claim 1, further comprising a fairlead positioned between the retainer housing and the base of the cable tie member, the fairlead having at least one wire receiving passageway.

18. The cable tie system according to claim 17 wherein the fairlead is integrally formed on the retainer housing.

19. The cable tie system according to claim 18, wherein the fairlead is hingedly connected to the retainer housing.

20. A cable tie system comprising:

a cable tie member having a base with an inner facing surface and an opposite outer facing surface, a pair of cable tie strips connected to the base and projecting outward from the inner facing surface, each cable tie strip having a free end with a raceway engaging hook positioned on an outwardly facing surface, a locking member connected to the base and projecting outward from outer facing surface, and a cable retaining member having a retainer housing with a top surface, an opposite bottom surface, and a pair of tie strip receiving passageways complimentary to the cable tie strips, and extending from the top surface to the bottom surface, and a resilient tie strip engaging arm positioned in each tie strip receiving passageway and in releasable contact with one of the cable tie strips when the cable tie strips are positioned in the tie strip receiving passageways.

21. The cable tie system according to claim 20, wherein the tie strip receiving passageways have centrally positioned openings that enable the raceway engaging hook to be longitudinally inserted through the cable tie receiving passageways.

* * * * *